(12) United States Patent
Yan et al.

(10) Patent No.: US 11,012,742 B2
(45) Date of Patent: May 18, 2021

(54) VIDEO SCRAMBLING METHOD AND DEVICE WITH ADAPTIVE MODE SELECTION, NETWORK CAMERA AND READABLE STORAGE MEDIUM

(71) Applicant: ZHEJIANG UNIVIEW TECHNOLOGIES CO., LTD., Binjiang District Hangzhou (CN)

(72) Inventors: Kesen Yan, Binjiang District Hangzhou (CN); Hui Wu, Binjiang District Hangzhou (CN)

(73) Assignee: ZHEJIANG UNIVIEW TECHNOLOGIES CO., LTD., Binjiang District Hangzhou (CN)

( * ) Notice: Subject to any disclaimer, the term of this patent is extended or adjusted under 35 U.S.C. 154(b) by 0 days.

(21) Appl. No.: 16/637,112

(22) PCT Filed: Jul. 26, 2018

(86) PCT No.: PCT/CN2018/097195
§ 371 (c)(1),
(2) Date: Feb. 6, 2020

(87) PCT Pub. No.: WO2019/029373
PCT Pub. Date: Feb. 14, 2019

(65) Prior Publication Data
US 2020/0252684 A1    Aug. 6, 2020

(30) Foreign Application Priority Data

Aug. 7, 2017    (CN) .......................... 201710665978.3

(51) Int. Cl.
*H04N 21/4408* (2011.01)
*H04N 19/13* (2014.01)
(Continued)

(52) U.S. Cl.
CPC ......... *H04N 21/4408* (2013.01); *H04N 5/913* (2013.01); *H04N 19/13* (2014.11);
(Continued)

(58) Field of Classification Search
CPC .. H04N 21/4408; H04N 19/13; H04N 19/176; H04N 19/61; H04N 19/70; H04N 5/913; H04N 19/46
See application file for complete search history.

(56) References Cited

U.S. PATENT DOCUMENTS

2004/0028227 A1*  2/2004  Yu ....................... H04L 63/0478
                                                             380/201
2006/0164544 A1*  7/2006  Lecomte .......... H04N 21/23476
                                                             348/390.1
(Continued)

FOREIGN PATENT DOCUMENTS

CN      1882082      12/2006
CN    102084663       6/2011
(Continued)

OTHER PUBLICATIONS

Office Action dated Dec. 25, 2019 in CN Patent Application No. 201710665978.3, pp. 1-11.
(Continued)

*Primary Examiner* — Tracy Y. Li
(74) *Attorney, Agent, or Firm* — Byrne Poh LLP

(57) ABSTRACT

The present application discloses a video scrambling method and device with adaptive mode selection, a network camera and a readable storage medium, which are used for scrambling a video code stream. The video scrambling method with adaptive mode selection comprises: firstly acquiring a video code stream and determining the frame type of a current frame; and then scrambling, according to the frame type of the current frame, the data subjected to entropy
(Continued)

decoding by using a scrambling method corresponding to the frame type. The video scrambling device with adaptive mode selection in the present application comprises a determination module and a scrambling module. According to the method and device of the present application, I-frames and P-frames are respectively scrambled, without changing the original coding standard format, effectively scrambling the video contents, and improving the security of video content information.

14 Claims, 2 Drawing Sheets

(51) Int. Cl.
  *H04N 19/176* (2014.01)
  *H04N 19/61* (2014.01)
  *H04N 19/70* (2014.01)
  *H04N 5/913* (2006.01)
(52) U.S. Cl.
  CPC ........... *H04N 19/176* (2014.11); *H04N 19/61* (2014.11); *H04N 19/70* (2014.11)

(56) References Cited

U.S. PATENT DOCUMENTS

| | | | |
|---|---|---|---|
| 2014/0029521 A1* | 1/2014 | Puthenpura | H04L 5/0053 370/329 |
| 2014/0157086 A1* | 6/2014 | Sharon | G06F 12/00 714/773 |
| 2014/0161192 A1* | 6/2014 | Sato | H04N 19/56 375/240.16 |
| 2014/0161196 A1 | 6/2014 | Culebro et al. | |
| 2015/0304709 A1 | 10/2015 | Zhang et al. | |
| 2016/0156970 A1 | 6/2016 | Yi et al. | |

FOREIGN PATENT DOCUMENTS

| | | |
|---|---|---|
| CN | 102905133 | 1/2013 |
| CN | 103716637 | 4/2014 |
| EP | 2884748 | 6/2015 |
| KR | 20070077002 | 7/2007 |

OTHER PUBLICATIONS

International Search Report dated Oct. 11, 2018 in International Patent Application No. PCT/CN2018/097195.
Extended European Search Report dated Jan. 13, 2021 in EP Patent Application No. 18845111.6, pp. 1-8.

* cited by examiner

VIDEO SCRAMBLING METHOD AND DEVICE WITH ADAPTIVE MODE SELECTION, NETWORK CAMERA AND READABLE STORAGE MEDIUM

CROSS-REFERENCE TO RELATED APPLICATIONS

This application is a National Stage Application, filed under 35 U.S.C. § 371, of International Patent Application No. PCT/CN2018/097195, filed on Jul. 26, 2018, which claims priority to a Chinese patent application No. 201710665978.3 filed on Aug. 7, 2017 to the CNIPA and entitled "VIDEO SCRAMBLING METHOD AND DEVICE WITH ADAPTIVE MODE SELECTION", disclosure of which is incorporated herein by reference in its entirety.

TECHNICAL FIELD

The present application belongs to the field of video scrambling and, in particular, relates to a video scrambling method and device with adaptive mode selection, an Internet protocol camera (IPC) and a readable storage medium.

BACKGROUND

With the development of Internet technologies, it becomes easy to acquire information. Therefore, the importance of information security has become increasingly prominent. In video surveillance, it is particularly important to encrypt and scramble image information in order to prevent an unauthorized user from acquiring video image content transmitted and stored in a video surveillance system. In particular, video scrambling is a major problem to be solved urgently under the premise that it is guaranteed to be compatible with a coding format of a front-end equipment, an Internet protocol (IP) camera (IPC) (that is, a code stream is still compatible with MPEG-4/H.264/H.265 standards and can still be decoded by a decoder which is compatible with the MPEG-4/H.264/H.265 standards).

All the current IPC encoding chips do not support a video scrambling function, so the video scrambling needs to be performed by quickly transcoding the code stream outputted by the encoding chip in the form of software in the IPC, that is, the real-time performance is satisfied while transcoding and scrambling are performed. In the existing art, the most direct method for scrambling a video image is to scramble the video as common text data by using an algorithm similar to a data encryption standard (DES). However, this traditional encryption algorithm involves complicated calculations, and the huge volume of video data results in a slow calculation speed, which is not suitable for use in the front-end equipment in the surveillance field.

Therefore, extensive researches are performed on the scrambling of encoded semantic information in a transform domain. However, in the existing art, when the encoded semantic information is scrambled, enough attention is not paid to video content, and the balance between a scrambling effect and a code rate change cannot be achieved. For example, in the existing art, a bit string is constructed by positive and negative signs and position information of quantized transform coefficients in a transform block such that a plaintext data block to be encrypted is generated, the generated plaintext data block is encrypted such that the ciphertext after encryption is generated, a bit corresponding to a non-zero quantized transform coefficient in the ciphertext after encryption is converted into a new positive or negative sign, and entropy coding is performed. However, the video content is not understood in this method. The same scrambling manner is used, so that it is easy for the video content to be cracked. In addition, only residual signs are scrambled, and the scrambling effect is uncontrollable. In addition, the characteristics of a prediction (P) frame of the code stream are not fully analyzed, and scrambling modes for an intra (I) frame and the P frame are not distinguished.

SUMMARY

The present application aims to provide a video scrambling method and device with adaptive mode selection, an IPC and a readable storage medium. According to an IPPP coding structure in the field of video surveillance, video content to be scrambled is analyzed, multiple scrambling modes are proposed, and a scrambling mode is adaptively selected according to different levels and video content information, which implements efficient video scrambling with the comprehensive consideration of indicators such as algorithm complexity, a scrambling effect and a code rate.

To achieve at least one of the preceding objects, in a first aspect, an embodiment of the present application provides the technical solution described below.

A video scrambling method with adaptive mode selection is used for scrambling a video stream and includes steps described below.

The video stream is acquired and a frame type of a current frame is determined.

Data subjected to entropy decoding is scrambled by using a scrambling manner corresponding to the frame type according to the frame type of the current frame.

In condition that the frame type of the current frame is an I frame, scrambling the data subjected to the entropy decoding by using the scrambling manner corresponding to the frame type includes steps described below.

A prediction block of a current block is acquired.

In condition that a size of the prediction block is less than a set parameter, hybrid scrambling is performed on the data subjected to the entropy decoding, where the hybrid scrambling includes scrambling the data subjected to the entropy decoding in at least two scrambling modes.

In condition that the size of the prediction block is greater than or equal to the set parameter, single-mode scrambling is performed on the data subjected to the entropy decoding, where the single-mode scrambling includes scrambling the data subjected to the entropy decoding in one scrambling mode.

In condition that the frame type of the current frame is a P frame, scrambling the data subjected to the entropy decoding in the scrambling manner corresponding to the frame type includes steps described below.

According to a set security level, in condition that the security level of the current frame is a first level, P frame data encryption scrambling is performed; in condition that the security level of the current frame is a second level, P frame sliced scrambling is performed; and in condition that the security level of the current frame is a third level, no scrambling is performed on the P frame.

Furthermore, the P frame sliced scrambling includes steps described below.

A motion region and a background region are extracted for the current frame to acquire a corresponding motion information map.

The current frame is divided into a heat region and a non-heat region to acquire a corresponding heat information map.

The current frame is divided into an interested slice of the P frame and a non-interested slice of the P frame according to the motion information map and the heat information map.

Low-code-rate scrambling is performed on the non-interested slice of the P frame.

P frame strong scrambling is performed on the interested slice of the P frame.

The P frame strong scrambling includes scrambling by using at least two scrambling modes.

Furthermore, the video scrambling method with adaptive mode selection further includes a step described below.

A calculation is performed according to a scrambling key update period by using a designated key character string format and an encryption algorithm to obtain a scrambling key.

Furthermore, determining the frame type of the current frame includes a step described below.

The frame type of the current frame is determined according to a network abstract layer (NAL) type of the acquired current frame.

In a second aspect, an embodiment of the present application further provides a video scrambling device with adaptive mode selection, which is used for scrambling a video stream.

The video scrambling device with adaptive mode selection includes a determining module and a scrambling module.

The determining module is configured to acquire the video stream and determine a frame type of a current frame.

The scrambling module is configured to scramble data subjected to entropy decoding in a scrambling manner corresponding to the frame type according to the frame type of the current frame.

In condition that the frame type of the current frame is an I frame, the scrambling module is specifically configured to perform operations described below.

A prediction block of a current block is acquired.

In condition that a size of the prediction block is less than a set parameter, hybrid scrambling is performed on the data subjected to the entropy decoding, where the hybrid scrambling includes scrambling the data subjected to the entropy decoding by using at least two scrambling modes.

In condition that the size of the prediction block is greater than or equal to the set parameter, single-mode scrambling is performed on the data subjected to the entropy decoding, where the single-mode scrambling includes scrambling the data subjected to the entropy decoding by using one scrambling mode.

In condition that the frame type of the current frame is a P frame, the scrambling module is specifically configured to operations described below.

In condition that a security level of the current frame is a first level, P frame data encryption scrambling is performed; in condition that the security level of the current frame is a second level, P frame sliced scrambling is performed; and in condition that the security level of the current frame is a third level, no scrambling is performed on the P frame.

Furthermore, the video scrambling device with adaptive mode selection further includes a key update module.

The key update module is configured to perform a calculation according to a scrambling key update period by using a designated key character string format and an encryption algorithm to obtain a scrambling key.

Furthermore, the determining module is specifically configured to perform an operation described below.

The frame type of the current frame is determined according to a network abstract layer (NAL) type of the acquired current frame.

In a third aspect, an embodiment of the present application further provides an IPC including a processor and a non-volatile memory storing a number of computer instructions, where when the computer instructions are executed by the processor, the IPC performs the video scrambling method with adaptive mode selection described in the first aspect.

In a fourth aspect, an embodiment of the present application further provides a readable storage medium, including computer programs, where when the computer programs are executed, an IPC where the readable storage medium is located is controlled to perform the video scrambling method with adaptive mode selection described in the first aspect.

The embodiments of the present application provide the video scrambling method and device with adaptive mode selection, the IPC and the readable storage medium, so that I frames and P frames are scrambled separately without changing the original standard coding format, effectively scrambling video content and improving the security of video content information. The present application ensures not only the security of the background region but also the security of the motion region. The P frame is scrambled according to the security level. To comprehensively consider security, the code rate and arithmetic complexity, the scrambling mode may be selected according to different applications by configuring the security level. In the present application, factors in aspects of security, complexity and the code rate are comprehensively considered to provide an efficient video scrambling scheme.

BRIEF DESCRIPTION OF DRAWINGS

To illustrate solutions in embodiments of the present application more clearly, the drawings required to be used in the embodiments will be briefly described below. In should be understood that the drawings described below illustrate merely part of the embodiments of the present application and should not be regarded as limitations on the scope. Those skilled in the art may obtain other drawings based on the drawings described below on the premise that no creative work is done.

DETAILED DESCRIPTION

Solutions of the present application are further described below in detail in conjunction with the drawings and embodiments. The embodiments described below are not intended to limit the present application.

In this embodiment, video scrambling with adaptive mode selection refers to adaptively employing, according to the classification of different frame types and different security attributes, corresponding scrambling modes to perform video scrambling on a code stream encoded by commonly used standards such as MPEG-4/H.264/H.265.

When compression coding is performed on a video image sequence, an encoder divides all inputted frames of image into three different types according to their reference images: an intra (I) frame, a bidirection prediction (B) frame and a prediction (P) frame. Since merely the I frame and the P frame are considered in most surveillance video compression systems, merely the I frame and the P frame are used as examples for description in this embodiment.

The compression of digital video signals enables a volume of video data to be extremely compressed, which is conducive to transmission and storage. Commonly used video compression coding includes prediction coding and transform coding. The prediction coding includes intra-prediction coding and inter-prediction coding. Currently discrete cosine transform (DCT) is generally employed for the transform coding. A common digital video compression coding method is hybrid coding, that is, the intra-prediction coding or the inter-prediction coding is performed on an image, and then the DCT, quantization and entropy coding are performed on a residual signal after prediction. The hybrid coding method has become a basic framework of many international standards for video compression coding.

In the following detailed description, some technical terms related to compression coding, such as a prediction block, a macroblock, DCT, quantization, entropy coding, a slice, a skip mode, and supplemental enhancement information (SEI), are all common technical terms in the field and not described one by one.

Figures 1, 2:
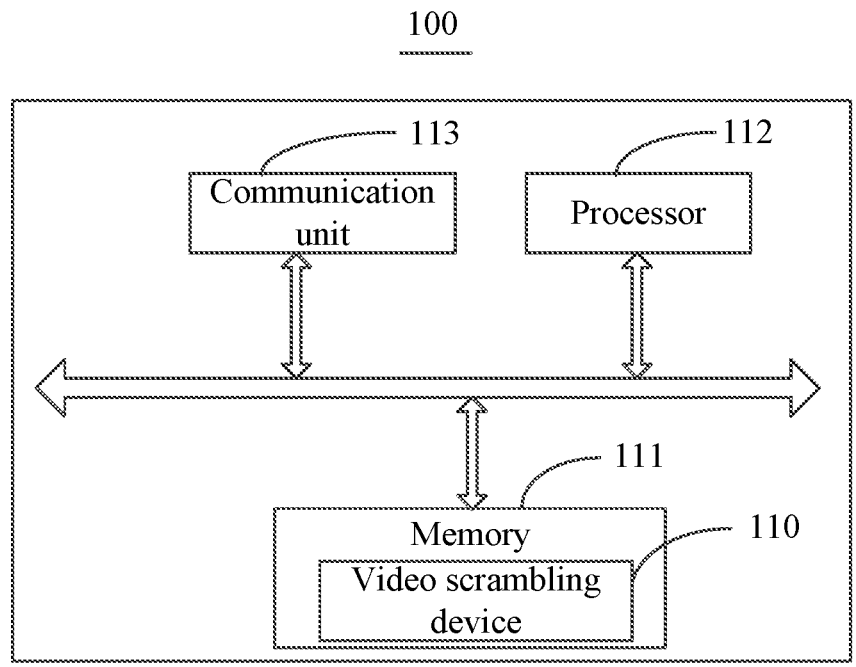
FIG. 1 is a structural diagram of an IPC according to an embodiment of the present application.
FIG. 2 is a flowchart of a video scrambling method with adaptive mode selection according to an embodiment of the present application.

Referring to FIG. 1, this embodiment provides a block diagram of an IPC 100. The IPC 100 may include a video scrambling device 110, a memory 111, a storage controller 112 and a processor 113.

Elements of the memory 111, the storage controller 112 and the processor 113 are directly or indirectly in electrical connections between each other to implement data transmission or interactions. For example, the electrical connections between these components may be implemented through one or more communication buses or signal lines. The video scrambling device 110 may include at least one module which may be stored in the form of software or firmware in the memory 111 or fixed in a software function module of the IPC 100. The processor 113 is configured to execute executable modules stored in the memory 111, such as software function modules and computer programs included in the video scrambling device 110. After receiving an execution instruction, the processor 113 may execute the programs. Meanwhile, after receiving the execution instruction, the processor 113 may further process (for example, scrambling) an image captured by the IPC 100. Accesses of the processor 113 and other possible components to the memory 111 may be performed under the control of the storage controller 112.

The processor 113 may be an integrated circuit chip with a signal processing capability. The processor 113 may be a general-purpose processor such as central processing unit (CPU), a network processor (NP), a digital signal processor (DSP), an application specific integrated circuit (ASIC), a field-programmable gate array (FPGA) or other programmable logic devices, discrete gates or transistor logic devices or discrete hardware components. The processor 113 may implement or execute various methods, steps and logic block diagrams disclosed in the embodiments of the present disclosure. The general-purpose processor may be a microprocessor or any conventional processor.

In should be understood that the structure shown in FIG. 1 is merely the structural diagram of the IPC 100. The IPC 100 may further include more or fewer components than those shown in FIG. 1 or may have a configuration different from that shown in FIG. 1. Various components shown in FIG. 1 may be implemented by hardware, software or a combination thereof.

As shown in FIG. 2, a video scrambling method with adaptive mode selection according to an embodiment of the present application includes steps described below.

A video stream is acquired and a frame type of a current frame is determined.

Data subjected to entropy decoding is scrambled in a scrambling manner corresponding to the frame type according to the frame type of the current frame.

After the video stream is acquired, it may be determined whether the current frame is an I frame or a P frame according to a network abstract layer (NAL) type of the acquired current frame.

When prediction coding is performed, a prediction image is obtained for the I frame or the P frame through intra-prediction or inter-prediction, respectively. Specific processes of the scrambling in scrambling manners corresponding to different frame types are separately described below through different embodiments.

In embodiment one, if the current frame is the I frame, a scrambling manner corresponding to the I frame is single-mode scrambling, that is, any one of a macroblock prediction scrambling mode, a residual coefficient sign scrambling mode or a residual amplitude scrambling mode may be used for scrambling.

Alternatively, the scrambling manner corresponding to the I frame is to perform hybrid scrambling on the data subjected to the entropy decoding, that is, at least two of the macroblock prediction scrambling mode, the residual coefficient sign scrambling mode or the residual amplitude scrambling mode may be used for the scrambling.

In the intra-prediction, a prediction block is formed based on an encoded reconstruction block and a current block. For a luminance pixel, the prediction block is used for related operations of a 4*4 sub-block or a 16*16 macroblock. A 4*4 luminance block has 9 optional prediction modes (for example, mode 0 to mode 8), where mode 0 to mode 8 correspond to a vertical mode, a horizontal mode, a DC mode, a lower left diagonal mode, a lower right diagonal mode, a vertical right mode, a horizontal down mode, a vertical left mode and a horizontal up mode. Independent prediction of each 4*4 luminance block is applicable to image coding with a lot of details. A 16*16 luminance block has 4 prediction modes (corresponding to the DC mode, the horizontal mode, the vertical mode and a Plane mode). The prediction of the entire 16*16 luminance block is applicable to image coding in a flat region. A chrominance block also has 4 prediction modes similar to those of the 16*16 luminance block. An encoder generally selects a prediction mode with a minimum difference between the prediction block and the encoded block for prediction.

In the macroblock prediction scrambling mode, after the entropy decoding, information on the prediction block and a prediction mode corresponding to the current block may be obtained, and then the prediction mode of the current block is replaced with a prediction mode symmetrical to the prediction mode for the prediction coding. The 4*4 prediction block of the I frame is used as an example. A prediction mode of the 4*4 prediction block is obtained after the entropy decoding, and the prediction mode is replaced. The 4*4 prediction block has 9 prediction modes, where modes 0, 1, 2 and 3 are symmetrical to modes 8, 7, 6 and 5, respectively, and mode 4 is symmetrical to itself. Assuming that the prediction mode of the current block is mode 0, the prediction mode is replaced with mode 8 for the prediction coding to achieve the scrambling. During descrambling, the prediction mode needs to be reversed for decoding.

In the residual coefficient sign scrambling mode, after the entropy decoding, residual coefficients (coefficients after transform and quantization) corresponding to the 4*4 prediction block are also obtained. There are 16 residual coefficients in total, and each coefficient has a sign and an amplitude. Scrambling the sign refers to an operation on each symbol and each bit of a value of a scrambling key. A specific operation is not limited. For example, a first symbol and a first bit of the key are operated. The specific operation is bit arithmetic, for example, an XOR operation is performed on the first symbol and the first bit of the scramble key.

In the residual amplitude scrambling mode, after the entropy decoding, the residual coefficients (coefficients after transform and quantization) corresponding to the 4*4 prediction block are also obtained. The amplitude pf the residual coefficient is directly scrambled by performing an arithmetic operation on the magnitude of each residual coefficient and the scrambling key. A specific arithmetic operation is not limited.

This embodiment adopts a hybrid scrambling mode including the macroblock prediction scrambling mode, the residual coefficient sign scrambling mode and the residual amplitude scrambling mode. The hybrid scrambling mode may adopt any two of the scrambling modes or three scrambling modes for hybrid scrambling. For example, the macroblock prediction scrambling mode and the residual coefficient sign scrambling mode are used for the hybrid scrambling, or the macroblock prediction scrambling mode and the residual amplitude scrambling mode are used for the hybrid mode, or the macroblock prediction scrambling mode, the residual coefficient sign scrambling mode and the residual amplitude scrambling mode are used for the hybrid scrambling. When the hybrid scrambling is performed, one scrambling mode is used for scrambling, and then another scrambling mode is used for scrambling, where an application order of the scrambling modes is not limited.

It should be noted that this embodiment lists three modes including the macroblock prediction scrambling mode, the residual coefficient sign scrambling mode and the residual amplitude scrambling mode. Those skilled in the art may also add more other single scrambling modes for the hybrid scrambling or separate scrambling, which is not repeated here. The present application is not limited to a specific single scrambling mode.

In embodiment two, when the current frame is the I frame, the scrambling is separately performed in corresponding scrambling manners according to a size of the prediction block.

In condition that the size of the prediction block is greater than or equal to a set parameter, single-mode scrambling is performed on the data subjected to the entropy decoding, where the single-mode scrambling includes scrambling the data subjected to the entropy decoding by using one scrambling mode.

In condition that the size of the prediction block is less than the set parameter, the hybrid scrambling is performed on the data subjected to the entropy decoding, where the hybrid scrambling includes scrambling the data subjected to the entropy decoding by using at least two scrambling modes.

It is to be noted that embodiment two provides preferred scrambling manners. In condition that the size of the prediction block is greater than or equal to the set parameter, the residual coefficient sign scrambling mode may be used for scrambling, or merely the macroblock prediction scrambling mode or the residual amplitude scrambling mode may be used. The hybrid scrambling includes scrambling the data subjected to the entropy decoding in at least two scrambling modes, that is, at least two of the macroblock prediction scrambling mode, the residual coefficient sign scrambling mode or the residual amplitude scrambling mode are used for scrambling the data subjected to the entropy decoding. The scrambling modes and the hybrid scrambling have been described in embodiment one and will not be repeated here.

The I frame is coded by the intra-prediction. Regions may be divided according to the size of the prediction block. Generally, the size of the prediction block reflects texture information of the image to a certain extent. The prediction block with a large size is applicable to the image coding in the flat region. The prediction block with a small size is applicable to image coding in a region with a lot of details (complex region). In this embodiment, H.264 is used as an example, an I-frame region with the prediction block of size 16*16 is classified as a flat block, and the remaining I-frame regions are classified complex blocks. For H.265, an I-frame region with the prediction block with a size greater than 32*32 may be classified as the flat block, which is not repeated here. That is, for the flat region (the size of the prediction block is greater than or equal to 16*16), the residual coefficient sign scrambling mode is used, and for the complex region (the size of the prediction block is less than 16*16), the hybrid scrambling mode is used.

In this embodiment, since the I frame is a key frame, full scrambling is required. A feature of the hybrid scrambling is a significant scrambling effect and extra bit overheads. A feature of merely residual coefficient sign scrambling is a general scrambling effect and no extra bit overheads. Therefore, the scrambling method in this embodiment can achieve a better scrambling effect without increasing an excessive code rate.

In embodiment three, in condition that the current frame is the P frame, multiple scrambling manners are included, such as P frame data encryption scrambling, P frame sliced scrambling, and no scrambling on the P frame.

The P frame data encryption scrambling in this embodiment includes steps described below.

A slice header is extracted and directly copied as a slice header of a new code stream.

Arithmetic scrambling is performed on macroblock information code stream without the slice header and the scrambling key. A specific operation is an operation on one byte of code stream data and one byte of the scrambling key. The specific operation is not limited. All data is scrambled to obtain the scrambled data.

The slice header of the new code stream and the scrambled data are spliced to form new code stream data.

After the P frame data encryption scrambling is performed, a person who illegally obtains the video stream cannot decode frame data. The security is high, but the P frame is black and video structure information cannot be observed.

In this embodiment, a P frame sliced scrambling mode is to perform the scrambling according to a slice after an interested region is determined according to motion information and heat information, and includes steps described below.

Low-code-rate scrambling is performed on a non-interested slice of the P frame.

P frame strong scrambling is performed on an interested slice of the P frame.

The low-code-rate scrambling means to scale a quantized residual coefficient down to ½ in this embodiment (for low-code-rate encoding, the residual coefficient is doubled and a level may be lost during descrambling). Next, it is determined whether the scaled coefficients in the macroblock are all zero. If so, a macroblock mode is changed to a skip mode, otherwise the original macroblock mode is still used. This strategy not only ensures the scrambling effect but also reduces the code rate at the cost of losing a part of an image quality.

The P frame strong scrambling includes scrambling in at least two scrambling modes. For example, the scrambling is performed in a hybrid scrambling mode including motion vector residual scrambling, the macroblock prediction scrambling mode and a pixel residual coefficient scrambling mode. A specific operation of the motion vector residual scrambling (motion vector residual sign scrambling and amplitude scrambling) is to directly perform the bit arithmetic (such as the XOR operation) on the sign or the amplitude corresponding to a motion vector residual and a certain bit of the scrambling key, which is consistent with the previous operation. For the macroblock prediction scrambling mode and the pixel residual coefficient scrambling mode, reference is made to the description of the scrambling modes related to the I frame. A residual coefficient scrambling mode includes the residual coefficient sign scrambling mode and the residual amplitude scrambling mode. In practice, at least two scrambling modes are selected from five scrambling modes described above for the scrambling. When the hybrid scrambling is performed, one scrambling mode is used for the scrambling, and then another scrambling mode is used for the scrambling, where an application order of the scrambling modes is not limited.

Similarly, this embodiment lists the macroblock prediction scrambling mode, the pixel residual coefficient scrambling mode and the motion vector residual scrambling mode. Those skilled in the art may also add more other single scrambling modes for the hybrid scrambling or the separate scrambling, which is not repeated here. The present application is not limited to a specific scrambling mode and does not limit the application order of the scrambling modes in the P frame strong scrambling mode.

In this embodiment, the step of determining the interested region according to the motion information and the heat information includes steps descried below.

(1) Motion detection is performed. A motion detection method may be an optical flow method, a time-domain difference method or a background difference method. The background difference method is used as an example for description below.

A background image as reference is determined. The number of pixel points in the current frame is set to m. An absolute value of a difference between a gray value of each pixel point in the current frame and a gray value of a corresponding pixel point in the background image is calculated, where an absolute value of a difference corresponding to an i-th pixel point is pi, and a set of differences of the pixel points may be represented by {p1, p2, . . . pm}. When the difference corresponding to a certain pixel point is greater than a first preset value, the pixel point is marked as 1 and regarded as a motion region; otherwise, it is marked as 0 and regarded as a background region. In this way, a motion information map of the current frame may be obtained.

(2) Heat map statistics is performed. The current frame is divided into a heat region and a non-heat region to acquire corresponding heat information. A specific method may include: acquiring a historical frame within a preset time period previous to the current frame, detecting a target for each macroblock of each historical frame, recording a certain macroblock if the target is detected in the macroblock, and counting the number of records of each macroblock within the preset time period as heat information corresponding to the macroblock. Macroblocks whose numbers of records are greater than a second preset value are combined to obtain the heat region, and a region where the remaining macroblocks are located is the non-heat region. All pixel points in the heat region are marked as 1 and all pixel points in the non-heat region are marked as 0 to obtain a heat information map of the current frame.

(3) The current frame is divided into multiple sub-regions. A specific division manner and number of sub-regions are not limited. For example, three regions are included (the specific divided regions may be two, three or more regions, and preferably be three regions with the consideration of calculation amount and accuracy).

(4) A motion factor and a heat factor corresponding to each sub-region are calculated according to the motion information map and the heat information map for each sub-region. Specifically, the number of pixel points in a region corresponding to a sub-region in the motion information map is acquired, the number of marked pixel points in the region corresponding to the sub-region in the motion information map is calculated, and the motion factor Q1 corresponding to the sub-region is written as follows:

$$Q1 = \frac{\text{Number of marked pixel points in the region corresponding to the sub-region in the motion information map.}}{\text{Number of pixel points in the region corresponding to the sub-region in the motion information map}}.$$

The number of pixel points in a region corresponding to the sub-region in the heat information map is acquired, the number of marked pixel points in the region corresponding to the sub-region in the heat information map is calculated, and the heat factor Q2 corresponding to the sub-region is written as follows:

$$Q2 = \frac{\text{Number of marked pixel points in the region corresponding to the sub-region in the heat information map.}}{\text{Number of pixel points in the region corresponding to the sub-region in the heat information map}}.$$

(5) An interested factor Q corresponding to the sub-region is calculated.

That is, $$Q = \frac{Q1 + Q2}{2}.$$

If Q is greater than a preset threshold, such as 0.5, the sub-region is the interested region, and if Q is less than or equal to the preset threshold, the sub-region is a non-interested region.

(6) Every two adjacent interested regions are combined and every two adjacent non-interested regions are combined such that the current frame is divided into the interested slice of the P frame and the non-interested slice of the P frame.

No scrambling on the P frame in this embodiment, that is, the scrambling is not performed, has advantages of no extra bit overheads and low algorithm complexity.

In embodiment four, when the current frame is the P frame, corresponding scrambling modes are separately selected according to set security levels for the scrambling.

For example, the set security levels may be a first level, a second level and a third level separately. The security levels are sequentially the first level, the second level and the third level in a descending order. In condition that the security level is the first level, the P frame data encryption scrambling is performed. In condition that the security level is the second level, the P frame sliced scrambling is performed. In condition that the security level is the third level, the P frame is not scrambled.

Finally, after the scrambling ends, entropy coding needs to be performed on the scrambled data to restore it to code stream data. After the I frame is scrambled, SEI needs to be inserted before the I frame. The information includes scrambling key-related information (including key A delivered by an upper layer and random number B), an enable flag, the security level and slice information for the P frame. One I frame has one piece of SEI and one set of scrambling modes. The I frame and the P frame share a same key. At a decoding end, the descrambling needs to performed, the SEI is parsed to obtain information on scrambling modes, and the original code stream information is restored by inverse operations.

In this embodiment, a calculation is performed according to a scrambling key update period by using a designated key character string format and an encryption algorithm to obtain the scrambling key. Before the scrambling, policy control is performed on the scrambling key to ensure key security. The key character string format is defined as:

KEY($A,B,C$), where A is the key deliver by the upper layer, B is a random number, and C is a fixed character string length. A specific key update manner is as follows: it is determined whether to update the key according to the key update period; if the key needs to be updated, random number B is updated to form a new key with A and C, and the new key is encrypted by a Message-Digest Algorithm 5 (MD5) to obtain the final key:

key=$f$(MD5(KEY($A,B,C$)))

where $f(x)$ refers to a data processing function, such as four-byte integer accumulation. A specific method for generating the scrambling key is not limited in the present application. The I frame includes the SEI which includes the scrambling key-related information (including key A delivered by the upper layer and random number B), and the scrambling key is calculated by the same algorithm at the decoding end for the descrambling, which is not repeated here.

In this embodiment, while the key is calculated, the motion detection and the heat map statistics are performed. The main function of the motion detection is to divide the motion region and the background region. The main function of the heat map statistics is to determine a main active region of a monitored object in a monitoring screen, so as to determine the interested region.

In the technical solution of the present application, effective scrambling is performed on the video content without changing the original standard coding format, improving the security of video content information. Meanwhile, factors in aspects of security, complexity and the code rate are comprehensively considered to provide an efficient video scrambling scheme. In the present application, the I frame and the P frame are distinguished for the scrambling, which ensures not only the security of the background region but also the security of the motion region. The P frame is scrambled according to the security level. To comprehensively consider the security, the code rate and the arithmetic complexity, the scrambling mode may be selected according to different applications by configuring the security level.

Figure 3:
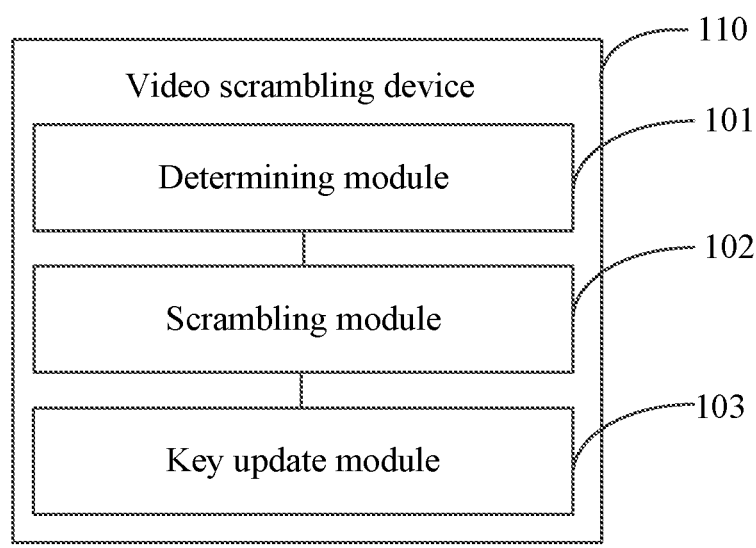
FIG. 3 is a diagram illustrating function modules of a video scrambling device with adaptive mode selection according to an embodiment of the present application.

As shown in FIG. 3, corresponding to the method described above, the present application further provides an embodiment of a video scrambling device with adaptive mode selection, which is used for scrambling a video stream.

The video scrambling device with adaptive mode selection 110 in this embodiment includes a determining module 101 and a scrambling module 102.

The determining module 101 is configured to acquire the video stream and determine a frame type of a current frame.

In this embodiment, the determining module 101 determines the frame type of the current frame according to a network abstract layer (NAL) type of the acquired current frame.

The scrambling module 102 is configured to scramble data subjected to entropy decoding in a scrambling manner corresponding to the frame type according to the frame type of the current frame.

Corresponding to the method described above, in condition that the frame type of the current frame is an I frame, the scrambling module 102 in this embodiment performs operations described below.

A prediction block of a current block is acquired.

In condition that a size of the prediction block is less than a set parameter, hybrid scrambling is performed on the data subjected to the entropy decoding, where the hybrid scrambling includes scrambling the data subjected to the entropy decoding in at least two scrambling modes.

In condition that the size of the prediction block is greater than or equal to the set parameter, single-mode scrambling is performed on the data subjected to the entropy decoding, where the single-mode scrambling includes scrambling the data subjected to the entropy decoding in one scrambling mode.

In condition that the frame type of the current frame is a P frame, the scrambling module 102 performs operations described below.

According to a set security level, in condition that the security level is a first level, P frame data encryption scrambling is performed; in condition that the security level is a second level, P frame sliced scrambling is performed; in condition that the security level is a third level, the P frame is not scrambled.

Specific scrambling modes used by the scrambling module 102 have been described above in detail and are not repeated here.

The video scrambling device with adaptive mode selection 110 in this embodiment further includes a key update module 103.

The key update module 103 is configured to perform a calculation according to a scrambling key update period by using a designated key character string format and an encryption algorithm to obtain a scrambling key.

The functions may be stored in a computer-readable storage medium if they are implemented in the form of software function modules and sold or used as independent products. Based on this understanding, the technical solutions of the present disclosure substantially, or the part contributing to the existing art, or part of the technical solutions may be embodied in the form of a software product. The computer software product is stored in a storage medium and includes several instructions for enabling an IPC 100 to perform all or part of the steps of the method according to the embodiments of the present disclosure. The preceding storage medium includes a USB flash disk, a mobile hard disk, a read-only memory (ROM), a random access memory (RAM), a magnetic disk, an optical disk or another medium capable of storing program codes.

The embodiments described above are merely used to explain the technical solutions of the present application and not to limit the technical solutions of the present application. Various corresponding changes and variations may be made by those skilled in the art according to the present application without departing from the spirit and essence of the present application. However, these corresponding changes and variations should fall within the scope of the appended claims of the present application.

INDUSTRIAL APPLICABILITY

The present application provides a video scrambling method and device with adaptive mode selection, an IPC and a readable storage medium, which provides an efficient video scrambling scheme with the comprehensive consideration of factors in aspects of security, complexity and a code rate.

What is claimed is:

1. A video scrambling method with adaptive mode selection, which is used for scrambling a video stream, comprising:
acquiring the video stream and determining a frame type of a current frame in the video stream; and
scrambling data subjected to entropy decoding based on the frame type of the current frame;
wherein when the frame type of the current frame is an intra (I) frame, the scrambling data subjected to entropy decoding comprises:
acquiring a prediction block of a current block of the current frame;
when a size of the prediction block is less than a set parameter, performing hybrid scrambling on the data, wherein the hybrid scrambling comprises scrambling the data by using at least two scrambling modes; and
when the size of the prediction block is greater than or equal to the set parameter, performing single-mode scrambling on the data, wherein the single-mode scrambling performs only one mode of scrambling.

2. The video scrambling method with adaptive mode selection of claim 1, wherein when the frame type of the current frame is a prediction (P) frame, the scrambling the data subjected to the entropy decoding comprises:
scrambling, according to a security level of the current frame, the data subjected to the entropy decoding based on the security level.

3. The video scrambling method with adaptive mode selection of claim 2, wherein the scrambling, according to the security level of the current frame, the data subjected to the entropy decoding comprises:
when the security level of the current frame is a first level, performing P frame data encryption scrambling; and
when the security level of the current frame is a second level, performing P frame sliced scrambling.

4. The video scrambling method with adaptive mode selection of claim 3, wherein the performing P frame sliced scrambling comprises:
extracting a motion region and a background region for the current frame to acquire a corresponding motion information map;
dividing the current frame into a heat region and a non-heat region to acquire a corresponding heat information map;
dividing, according to the motion information map and the heat information map, the current frame into an interesting slice of the P frame and a non-interesting slice of the P frame;
performing low-code-rate scrambling on the non-interesting slice of the P frame; and
performing P frame strong scrambling on the interesting slice of the P frame;
wherein the P frame strong scrambling comprises scrambling by using at least two scrambling modes.

5. The video scrambling method with adaptive mode selection of claim 1, further comprising:
performing a calculation according to a scrambling key update period by using a designated key character string format and an encryption algorithm to obtain a scrambling key.

6. The video scrambling method with adaptive mode selection of claim 1, wherein determining the frame type of the current frame comprises:
determining the frame type of the current frame according to a network abstract layer (NAL) type of the current frame.

7. A video scrambling device with adaptive mode selection, which is used for scrambling a video stream, comprising:
a memory; and
a hardware processor coupled to the memory and configured to:
acquire the video stream and determine a frame type of a current frame in the video stream; and
scramble data subjected to entropy decoding based on the frame type of the current frame;
wherein when the frame type of the current frame is an intra (I) frame, the scrambling data subjected to entropy decoding comprises:
acquiring a prediction block of a current block of the current frame;
when a size of the prediction block is less than a set parameter, performing hybrid scrambling on the data, wherein the hybrid scrambling comprises scrambling the data by using at least two scrambling modes; and
when the size of the prediction block is greater than or equal to the set parameter, performing single-mode scrambling on the data, wherein the single-mode scrambling performs only one mode of scrambling.

8. The video scrambling device with adaptive mode selection of claim 7, wherein when the frame type of the current frame is a prediction (P) frame, the scrambling the data subjected to the entropy decoding comprises:
scrambling, according to a security level of the current frame, the data subjected to the entropy decoding based on the security level.

9. The video scrambling device with adaptive mode selection of claim 8, wherein the scrambling, according to the security level of the current frame, the data subjected to the entropy decoding comprises:
when the security level of the current frame is a first level, performing P frame data encryption scrambling; and
when the security level of the current frame is a second level, perform P frame sliced scrambling.

10. The video scrambling device with adaptive mode selection of claim 9, wherein the performing the P frame sliced scrambling comprises:
extracting a motion region and a background region for the current frame to acquire a corresponding motion information map;
dividing the current frame into a heat region and a non-heat region to acquire a corresponding heat information map;
dividing, according to the motion information map and the heat information map, the current frame into an interesting slice of the P frame and a non-interesting slice of the P frame;
performing low-code-rate scrambling on the non-interesting slice of the P frame; and
performing P frame strong scrambling on the interesting slice of the P frame;
wherein the P frame strong scrambling comprises scrambling by using at least two scrambling modes.

11. The video scrambling device with adaptive mode selection of claim 7, wherein the hardware processor is further configured to:
perform a calculation according to a scrambling key update period by using a designated key character string format and an encryption algorithm to obtain a scrambling key.

12. The video scrambling device with adaptive mode selection of claim 7, wherein determining the frame type of the current frame comprises:
determining the frame type of the current frame according to a network abstract layer (NAL) type of the current frame.

13. An Internet protocol camera, comprising: a hardware processor and a non-volatile memory storing a number of computer instructions, wherein when the computer instructions are executed by the hardware processor, the Internet protocol camera performs the video scrambling method with adaptive mode selection of claim 1.

14. A non-transitory computer readable storage medium, comprising computer programs, wherein when the computer programs are executed, an Internet protocol camera where the readable storage medium is located is controlled to perform the video scrambling method with adaptive mode selection of claim 1.

* * * * *